United States Patent [19]  [11] 3,941,143
Iijima  [45] Mar. 2, 1976

[54] AUTOMATIC TRANSMISSION HYDRAULIC CONTROL THROTTLE VALVE

[75] Inventor: Tetsuya Iijima, Tokyo, Japan

[73] Assignee: Nissan Motor Co., Ltd., Yokohama, Japan

[22] Filed: Oct. 3, 1974

[21] Appl. No.: 511,689

[30] Foreign Application Priority Data
Oct. 6, 1973  Japan............................ 48-111932

[52] U.S. Cl. ............... 137/102; 137/116; 137/628; 74/865
[51] Int. Cl.² .......................................... G05D 7/00
[58] Field of Search .......... 137/102, 116, 628, 109, 137/87, 98, 99; 74/865

[56] References Cited
UNITED STATES PATENTS
1,399,774  12/1941  Johnson ......................... 137/628 X
2,655,907  10/1953  Downing ........................ 137/87 X Primary Examiner—Martin P. Schwadron
Assistant Examiner—Robert J. Miller

[57] ABSTRACT

A valve spool and a piston are disposed substantially parallel to each other and are pivotably connected with a lever which is movable by the accelerator pedal of a prime mover. The force differential biasing the valve spool to withstand the force of the lever tending to move the valve spool is approximately zero. The valve spool has a valve land with a width equal to that of a port connected with a throttle pressure passage, and a constant neutral position in which the valve land registers with the port and hydraulic pressure in the passageway is equal to a throttle pressure depending on the position of the accelerator pedal. The piston is biased by the hydraulic pressure in the passageway and a spring in opposite directions to cause the valve spool to occupy the netural position.

5 Claims, 4 Drawing Figures

AUTOMATIC TRANSMISSION HYDRAULIC CONTROL THROTTLE VALVE

The present invention relates generally to a hydraulic control system of an automatic power transmission of a motor vehicle and particularly to a new and improved throttle valve for such a hydraulic control system.

As is well known in the art, a hydraulic control system of this type includes a throttle valve producing a throttle pressure which varies in accordance with engine torque or load demands and which is used to control a working or line pressure and vehicle speed at which an automatic gear shift should take place. A typical throttle valve is operatively connected with an engine throttle butterfly valve to produce a throttle pressure which varies in proportion to the degree of opening of the engine throttle valve. However, a conventional throttle valve of this type has been biased by a hydraulic force which requires a relatively large effort of the vehicle driver when he depresses the accelerator pedal. Furthermore, the hydraulic control system as hereinbefore referred to is usually constructed to produce a kickdown pressure which is supplied to a shift valve to cause a forced downshift or kickdown when the driver depresses the accelerator pedal to its full extent for accelerating the vehicle to pass a preceding motor vehicle. To this end, a conventional hydraulic control system has been provided with a kickdown valve separately from a throttle valve. Furthermore, a conventional hydraulic control system has been provided with an additional valve in order to discontinuously reduce the throttle pressure, for example, to zero to discontinuously reduce vehicle speed at which an automatic gear shift will take place during engine operation at a low engine throttle opening degree. As a result, the construction of the conventional hydraulic control system has been complicated.

It is, therefore, an object of the invention to provide a novel and improved throttle valve which enables the vehicle driver to depress the accelerator pedal by a considerably reduced effort.

It is a further object of the invention to provide a novel and improved throttle valve which also functions as a kickdown valve.

It is a still further object of the invention to provide a novel and improved throttle valve which maintains the throttle pressure at zero until the engine throttle valve is opened a predetermined amount.

These and other objects and advantages of the invention will become more apparent from the following detailed description taken in conjunction with the accompanying drawings in which.

Figure 1:
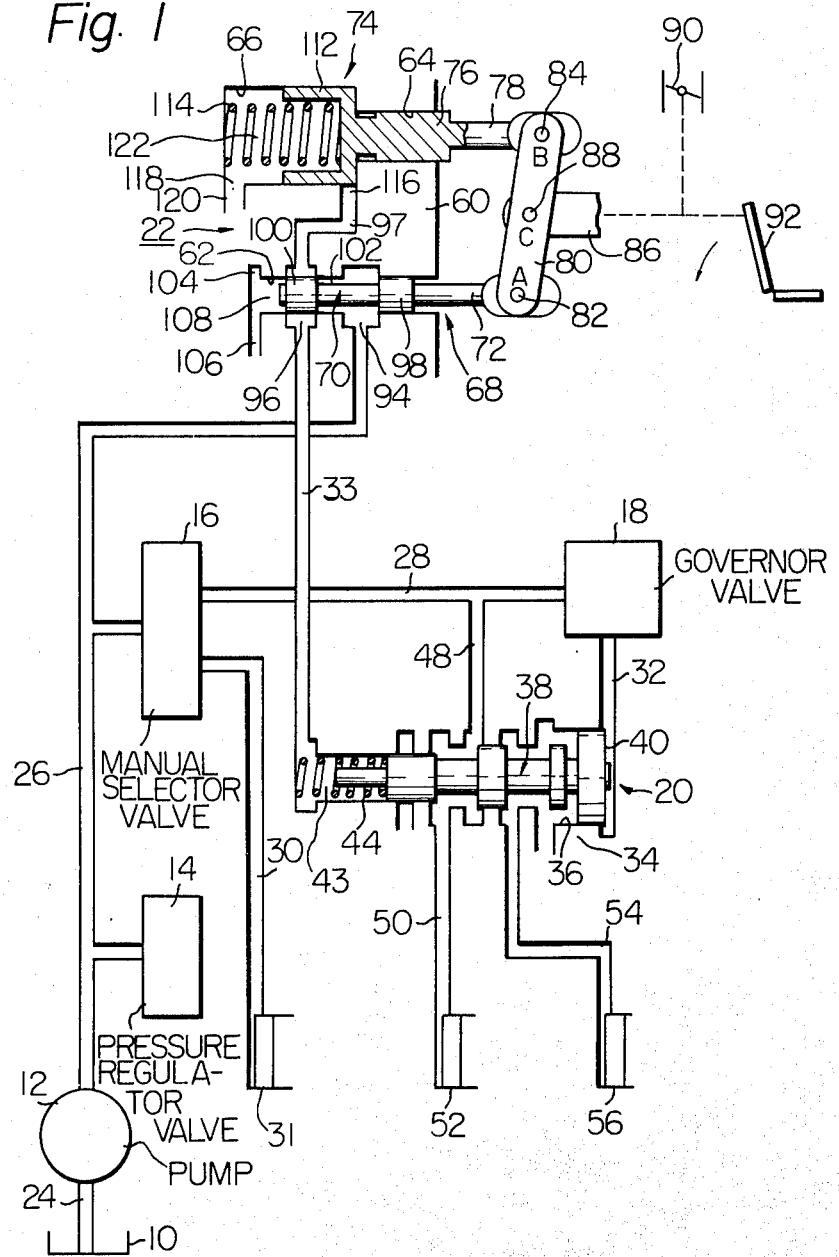
FIG. 1 is a schematic cross sectional view of a preferred embodiment of a hydraulic control system according to the invention.

Referring to FIG. 1, a hydraulic control system is shown to include a hydraulic fluid sump or reservoir tank 10, a pump 12, a pressure regulator valve 14, a manual selector valve 16, a governor valve 18, a shift valve 20 such as a 1–2 shift valve, and a throttle valve 22 according to the invention. These component elements form part of the hydraulic control system. Other various component elements forming the hydraulic control system are omitted. The pump 12 draws hydraulic fluid from the reservoir tank 10 by way of a conduit or passageway 24 and pumps or discharges hydraulic fluid under pressure as a control or line pressure into a conduit or passageway 26 interconnecting the pressure regulator valve 14, the manual selector valve 16 and the throttle valve 22. The pump 12 is driven by a prime mover or an engine of a motor vehicle (not shown) equipped with an automatic power transmission controlled by the hydraulic control system. The line pressure discharged into the passageway 26 flows to the pressure regulator valve 14 and is regulated at a predetermined value. The manual selector valve 16 has various forward driving gear ratio positions and a reverse driving gear ratio position which are attainable by manipulating a manually operated gear selector lever or the like (not shown). The manual selector valve 16 delivers the line pressure in the passageway 26 to a conduit or passageway 28 communicating with the governor valve 18 and the shift valve 20, when in the forward driving gear ratio position. The manual selector valve 16 also delivers the line pressure to a conduit or passageway 30 communicating with a servo motor 31, to cause operation thereof when in the reverse driving gear ratio position. The servo motor 31, when operated, causes the application of a reverse brake (not shown) of the transmission which forms one of friction elements for establishing a reverse driving gear ratio. The governor valve 18 is operated by a transmission output shaft (not shown) and generates a governor pressure varying in accordance with the vehicle speed and fed into a conduit or passageway 32. The shift valve 20 has a valve body 34 formed with a valve chamber 35 therein, and a valve spool 38 slidably fitted in the valve chamber 36. The passageway 32 communicates with a space 40 between the valve spool 38 and the right end wall surface in the drawing of the valve chamber 36 for supply of the governor pressure into the space 40. The governor pressure biases the valve spool 38 to the leftmost position in the drawing. A conduit 33 communicates with a space 43 between the valve spool 38 and the left end wall surface in the drawing of the valve chamber 36 for supply of throttle pressures into the space 43. The throttle pressure biases the valve spool 38 to the rightmost position shown in the drawing. A compression spring 44 is disposed between the valve spool 38 and the left end of the valve chamber 36 to bias the valve spool 38 to the rightmost position. The valve spool 38 is moved into the leftmost position by the force of the governor pressure overcoming the force of the throttle pressure and the action of the spring 44 to provide an automatic gear shift when the vehicle reaches a predetermined speed. When the valve spool 38 is in the rightmost position, it provides fluid communication between a branch conduit or passageway 48 of the conduit 28 and a conduit or passageway 50 communicating with a servo motor 52, to deliver the line pressure thereto to cause operation of the servo motor 52. When the valve spool 38 is in the leftmost position, it provides fluid communication between the branch passageway 48 and a conduit or passageway 54 communicating with a servo motor 56, to deliver the line pressure thereto to cause operation of the servo motor 56. The operated servo motor 52 causes the application of a low speed brake (not shown) of the transmission which forms one of friction elements for establishing a forward driving low speed ratio. The operated servo motor 56 causes the engagement of a high speed clutch (not shown) of the transmission which forms one of friction elements for establishing a forward driving high speed ratio.

The throttle valve 22 comprises a valve body 60 formed with a valve chamber 62 and first and second bores 64 and 66 therein, a spool valve 68 having a valve spool 70 slidably fitted in the valve chamber 62 and a stem 72 fixedly attached to the valve spool 70, and a positioning balancer 74 having a plunger 76 slidably fitted in the bore 64 and a stem 78 fixedly attached to the plunger 76. A link lever 80 is pivotably connected at one end with the stem 72 of the valve spool 70 by a pin 82 and at the other with the stem 78 of the plunger 76 by a pin 84 which serves as a first fulcrum of the link lever 80. The link lever 80 is also pivotably connected at an intermediate portion with a link member 86 by a pin 88 which serves as a second fulcrum of the link lever 80. The valve spool 70, plunger 76 and link member 86 are arranged substantially parallel to each other. The valve spool 70 and plunger 76 are opposite to the link member 86 with respect of the link lever 80. The link member 86 is operatively connected with a throttle or butterfly valve 90 of the engine and with an accelerator pedal 92, serving as a prime mover acceleration control member of the vehicle, by way of a suitable linkage mechanism, as shown in dotted lines in the drawing, so that movement of the accelerator pedal 92 causes a corresponding movement of the link lever 80 and thus the position of the pin 88 varies in accordance with the position of the accelerator pedal 92.

The valve chamber 62 is provided with a first annular recess or inlet port 94 which communicates with the conduit 26 and a second annular recess or outlet port 96 which communicates with the passageway 33 and with a conduit or passageway 97. The valve spool 70 has spaced first and second lands 98 and 100 with an idential diameter, and an annular groove 102 which is formed between the lands 98 and 100. The length or width of the land 100 is approximately identical with that of the outlet port 96. The inlet port 94 at all times communicates with the annular groove 102 to supply the line pressure into the valve chamber 62 at a location intermediate the lands 98 and 100. The valve chamber 62 is also provided with a third annular recess or drain port 104 which communicates with the sump 10 by way of a drain line 106 to vent a space 108 between the left end wall in the drawing of the valve chamber 62 and the land 100 to the sump 10. The valve spool 70 is normally in a neutral position shown in the drawing in which the land 100 registers with or closes the outlet port 96. The valve spool 70 is also in the neutral position when the accelerator pedal 92 is released, as shown in the drawing. The land 100 opens the outlet port 96 to provide communication between the inlet and outlet ports 94 and 96 to deliver a hydraulic fluid pressure into the passageways 33 and 97 to effect an increase in the hydraulic pressure in the passageways 33 and 97 when the valve spool 70 is moved leftwards in the drawing from the neutral position, and to provide communication between the outlet and drain ports 96 and 104 to effect a reduction in the hydraulic pressure in the passageways 33 and 97 when the valve spool 70 is moved rightwards in the drawing from the neutral position. Since the diameters of the lands 98 and 100 are equal to each other, the hydraulic force differential biasing the valve spool 70 in any direction is substantially zero.

The bore 66 is aligned with the bore 64. The positioning balancer 74 has a piston 112 which is integral with the plunger 76 and which is slidably fitted in the bore 66. The positioning balancer 74 is in the rightmost position shown in the drawing in which the piston 112 is in abutting engagement with the right end wall in the drawing of the bore 66 when the throttle valve 90 is in a fully closed position. A compression spring 114 is disposed between the piston 112 and the left end wall in the drawing of the bore 66 to bias the positioning balancer 74 to the rightmost position. The bore 66 is provided at the right end with a port 116 which communicates with the passageway 97. The hydraulic fluid pressure in the passageway 97 is supplied into a space or gap (not shown) between the piston 112 and the right end wall of the bore 66 from the passageway 97 by way of the port 116 and biases the positioning balancer 74 to the leftmost position in the drawing in opposition to the force of the spring 114. A hole or groove may be formed in the right end in the drawing of the piston 112 and/or the right end wall of the bore 66 to facilitate the entrance of the hydraulic fluid pressure into the last mentioned gap when the positioning balancer 74 is in the rightmost position, if desired. The bore 66 is also provided with a drain port 118 which communicates with the sump 10 by way of a drain line 120 to vent a space 122 between the piston 112 and the left end wall of the bore 66 to the sump 10.

The operation of the throttle valve 22 thus constructed is as follows.

When the accelerator pedal 92 is depressed to open the throttle valve 90 and the link member 86 moves the link lever 80 leftwards in the drawing, the positioning balancer 74 is held in an initial position or the rightmost position shown in FIG. 1 by the force of the spring 114 which serves as a reaction force to withstand the force of the link lever 80 which tends to move the positioning balancer 74 leftwards. However, the valve spool 70 is biased by no force differential which serves as reaction force to withstand the force of the link lever 80 which tends to move the valve spool 70 leftwards. As a result, the link member 86 is caused to rotate the link lever 80 clockwise in the drawing around the pin 84 which serves as the first fulcrum of the link lever 80. The valve spool 70 is moved by the thus rotated link lever 80 leftwards from the neutral position to provide communication between the inlet and outlet ports to deliver a hydraulic fluid pressure into the passageway 97 or to effect an increase in the hydraulic fluid pressure in the passageway 97. The positioning balancer 74 is moved leftwards by the force of the delivered or increased hydraulic fluid pressure in the passageway 97 acting on the right end of the piston 112 and overcoming the force of the spring 114. The link lever 80 is rotated counterclockwise in the drawing around the pin 88 which serves as the second fulcrum of the link lever 80 by the thus moved positioning balancer 74. The valve spool 70 is moved rightwards by the thus rotated link lever 80. In this instance, if the valve spool 70 is moved because of the hydraulic pressure force being higher than the force of the spring 114 into a position in which the land 100 opens the outlet port 96 to provide communication between the outlet and drain ports 96 and 104, the hydraulic pressure in the passageway 97 is discharged into the drain port 104 and is reduced. As a result, the positioning balancer 74 is moved into and held in a position in which the valve spool 70 is in the neutral position. If the valve spool 70 is moved because of the force of the spring 114 being higher than the hydraulic pressure force into a position in which the land 100 opens the outlet port 96 to provide communication between the inlet and outlet ports 94 and 96, the hydraulic pressure is delivered into the passageway 97 from the inlet port 94 and is increased. As a result, the positioning balancer 74 is similarly moved into and held in the position in which the valve spool 70 is in the neutral position. At this time, the positioning balancer 74 is in a position which is spaced or displaced from the initial position a distance equal to the displacement of the pin 88 and accordingly the link member 86 which is multiplied by AB/AC, with the link lever 80 being rotated around the pin 82. At this time, the hydraulic pressure in the passageways 33 and 97 is a throttle pressure Pth which is equal to the force F of the spring 114 which is divided by the surface area A of the right end of the piston 112 on which the hydraulic pressure in the passageway 97 acts, that is, F/A. Since the force of the spring 114 is equal to the spring constant thereof multiplied by the displacement of the spring 114 and accordingly of the link member 86, the force of the spring 114 and accordingly the throttle pressure are construction increased and reduced with an increase and a reduction in the displacement of the link member 86. Since the displacement of the link member 86 is nearly proportional to the displacement of the accelerator pedal 92, the throttle pressure is nearly proportional to the displacement of the accelerator pedal 92 and accordingly to the degree of opening of the throttle valve 90. This relationship or characteristics between the throttle pressure Pth and the opening degree S of the throttle valve 90 is shown by the solid line in FIG. 3.

Figure 2:
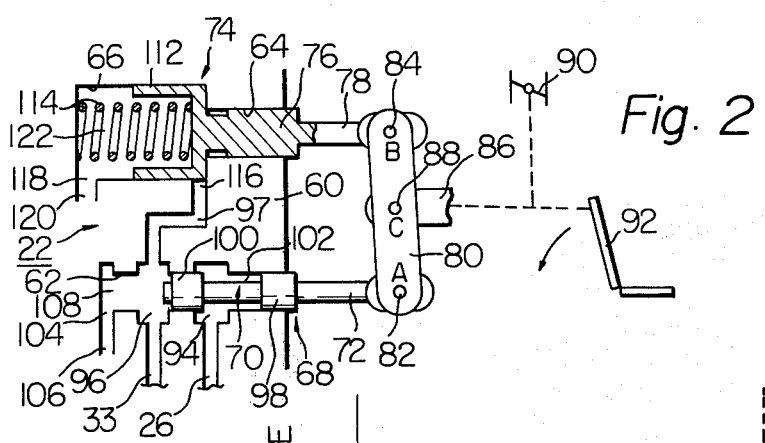
FIG. 2 is a schematic cross sectional view of a modification of a throttle valve according to the invention shown in FIG. 1.
Figure 3:
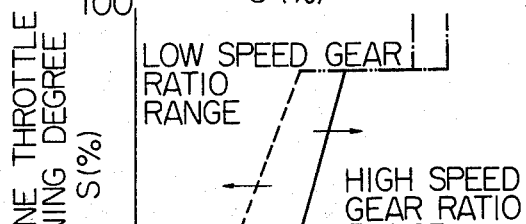
FIG. 3 is a graphic representation of the relationship between throttle pressures produced by a throttle valve according to the invention and the degree of opening of an engine throttle valve.

If desired, the throttle valve 22 may be constructed and arranged in such a manner that the spool 70 is in an initial position shown in FIG. 2 in which the land 100 opens the outlet port 96 and is between the inlet and outlet ports 94 and 96 when the accelerator pedal 92 is released and accordingly the throttle valve 90 is in its fully closed position. In this instance, the throttle pressure in the passageway 33 is maintained at zero since the passageway 33 is exhausted to the drain port 104. Such a condition is continued until the accelerator pedal 92 is depressed to the extent that the throttle valve 90 is opened a predetermined amount a and that the spool 70 is moved past the neutral position from the initial position. When this is attained, the land 100 closes communication between the outlet and drain ports 96 and 104 and opens communication between the inlet and outlet ports 94 and 96 so that hydraulic pressure is delivered into the passageways 33 and 97 to move the piston 112 against the action of the spring 114. As a result, the spool 70 is in the neutral position and the piston 112 is in a position depending on the position of the accelerator pedal 92 so that a throttle pressure corresponding to a throttle valve opening degree a, as shown in FIG. 3, is produced in the passageways 33 and 97.

Figure 4:
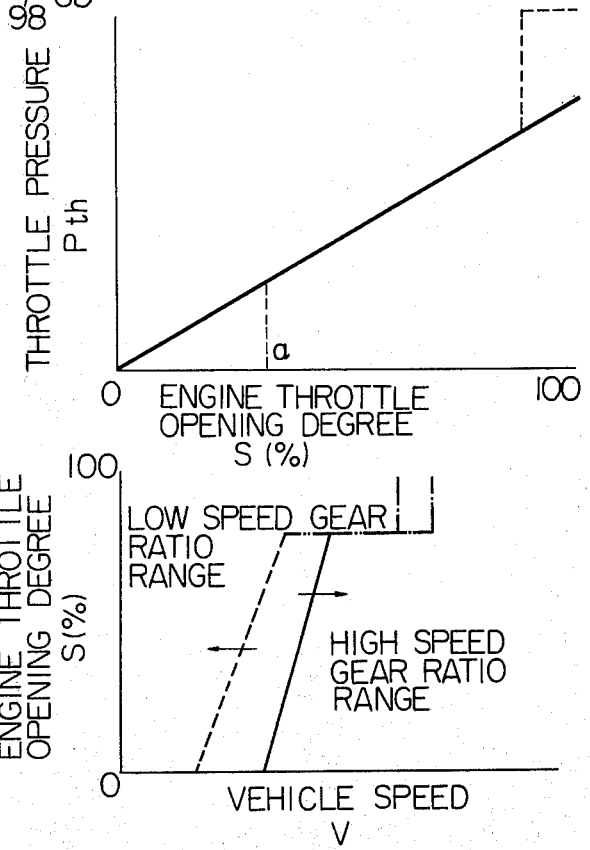
FIG. 4 is a graphic representation of the relationship between engine throttle valve opening degree and vehicle speed at which an automatic gear shift will take place.

If desired, the length of the bore 66 may be selected in such a manner that, when the valve spool 70 is in the neutral position with the accelerator pedal 92 being moved into the vicinity of the maximum output producing position, the positioning balancer 74 is in the leftmost or utmost position in the drawing in which the left end of the piston 112 is in abutting engagement with the left end wall of the bore 66. In this instance, when the accelerator pedal 92 is further moved beyond the vicinity of the maximum output generating position, the valve spool 70 remains moved into a position which is spaced from the neutral position and in which the hydraulic pressure equal to the line pressure is delivered as a throttle pressure into the passageways 33 and 97, by the link lever 80 rotated around the first fulcrum pin 84 by the link member 86. Thus, when the throttle valve 90 is moved beyond the vicinity of its fully open position, the shift valve 20 is supplied by way of the passageway 33 with the line pressure which is increased discontinuously from the normal throttle pressure and which serves as a kickdown pressure to effect a kickdown operation of the transmission. The relationship between the kickdown pressure Pth and the opening degree of the throttle valve 90 in the range beyond the vicinity of the fully open position is shown by the dotted line in FIG. 3. In this instance, the pattern of an automatic gear shifting established by the shift valve 20 includes a kickdown section in which automatic gear shift speeds are discountinously high in the range beyond the vicinity of the fully open position of the throttle valve 90, as shown by the dashed and dotted lines in FIG. 4.

It will be appreciated that a throttle valve according to the invention has an advantage in that a force for manipulating or depressing an accelerator pedal is considerably reduced by dividing a throttle valve into a valve spool operated by the accelerator pedal and a piston operated by hydraulic pressure, and by making the hydraulic force differential biasing the valve spool to withstand the force of a link lever which tends to move the valve spool approximately zero.

It will be appreciated that a throttle valve according to the invention has a further advantage in that an automatic transmission hydraulic control system employing the throttle valve can dispense with an additional valve for discontinuously reducing the throttle pressure, for example, to zero during engine operation at a low engine throttle opening degree and as a result, the construction of the hydraulic control system is simplified, by constructing the throttle valve in such a manner that a valve spool 70 is merely spaced from the neutral position and a land 100 closes communication between inlet and outlet ports 94 and 96 until the engine throttle valve is opened a predetermined amount.

It will be also appreciated that a throttle valve according to the invention has a still further advantage in that an automatic transmission hydraulic control system employing the throttle valve can dispense with a kickdown valve and conduits interconnecting a shift valve and the kickdown valve and interconnecting a line pressure conduit and the kickdown valve and as a result, the construction of the hydraulic control system is simplified, by employing a throttle valve which also serves as a kickdown valve by construction the throttle valve so as to merely select the size or length of the bore 66 to limit the stroke or displacement of the piston 112.

What is claimed is:
1. A throttle valve of a hydraulic control system of an automatic power transmission of a vehicle driven by a prime mover, comprising a lever pivotably connected at a first portion with a prime mover acceleration control member, a valve spool pivotably connected with said lever at a second portion which is spaced from said first portion along the length of said lever and having a constant neutral position, a passageway into and from which hydraulic fluid is delivered and discharged to increase and reduce the hydraulic pressure in said passageway when said valve spool is moved from said neutral position in axial, opposite directions, the hydraulic pressure in said passageway being equal to a throttle pressure depending on the position of said control member when said valve spool is in said neutral position, a piston pivotably connected with said lever at a third portion which is spaced from said first and second portions along the length of said lever, a spring urging said piston to prevent said piston from being moved by said lever when said control member is moved in a prime mover output increasing direction, said piston communicating with said passageway and being biased by the hydraulic pressure in said passageway against the action of said spring, said lever being rotatable around said piston by said control member to move said valve spool in said opposite directions when said control member is moved in prime mover output increasing and reducing directions, said piston being moved in response to the hydraulic pressure in said passageway lower and higher than said throttle pressure to move said valve spool from said neutral position in said opposite directions to cause increase and reduction in the hydraulic pressure in said passageway to said throttle pressure.

2. A throttle valve as claimed in claim 1, in which force differential biasing said valve spool to withstand the force of said lever tending to move said valve spool is approximately zero.

3. A throttle valve as claimed in claim 1, in which said valve spool is constructed to be spaced from said neutral position and to be in a position to prevent delivery of a hydraulic pressure into said passageway until said control member is moved into a predetermined output producing position.

4. A throttle valve as claimed in claim 1, in which said piston is maintained in the utmost position by the hydraulic pressure in said passageway overcoming the action of said spring and said valve spool is maintained in a position to maintain the hydraulic pressure in said conduit at a hydraulic pressure delivered to said slide valve, by said lever rotated around said piston by said control member, when the same is moved beyond the vicinity of the maximum output generating position.

5. A throttle valve as claimed in claim 1, further comprising a valve body formed with a valve chamber and a bore therein, said valve chamber being provided with an inlet port through which a hydraulic pressure is delivered into said valve chamber, an outlet port through which said passageway open into said valve chamber and a drain port, in which said valve spool is slidably fitted in said valve chamber and has spaced first and second lands with an identical diameter, and an annular groove which is formed therebetween and which communicates with said inlet port, said second land registering with said outlet port when said valve spool is in said neutral position and opening said outlet port to provide communication between said inlet and outlet ports when said valve spool is moved from said neutral position in one direction and to provide communication between said outlet and drain ports when said valve spool is moved from said neutral position in another direction, and in which said piston is slidably fitted in said bore and said spring is disposed between said piston and an end wall of said bore remote from said lever, said bore being provided at an end adjacent to said lever with a port through which said passageway opens into said bore to supply the hydraulic pressure into a space between said piston and the lastmentioned end of said bore, said piston being in a position depending on the position of said control member when said valve spool is in said neutral position.

* * * * *